3,429,407
OVERLOAD CLUTCHES
Olaf J. B. Orwin, Birmingham, and David J. Fortune, Bath, England, assignors to Fisholow Products, Limited, Tipton, England, a British company
Filed Dec. 29, 1966, Ser. No. 605,735
Claims priority, application Great Britain, Jan. 1, 1966, 3/66
U.S. Cl. 192—56      2 Claims
Int. Cl. F16d 23/00, 7/02, 43/20

ABSTRACT OF THE DISCLOSURE

Driving and driven clutch members having a plurality of torque transmitting balls interposed therebetween. One member is provided with torque transmitting openings to receive the balls which are movably disposed in oblique slots formed in the other member. The member with the openings is also provided with cam lobes for moving the balls outwardly in the slots of the slotted member, the balls in the slots engaging a thrust plate which is juxtaposed to and resiliently biased against the slotted member.

---

This invention relates to overload clutches of the kind herein called the kind specified comprising driving and driven clutch members having mutually registerable torque transmitting openings engaging with torque transmitting balls, and resilient loading means for releasably retaining said balls and openings in torque transmitting engagement with one another, the clutch incorporating ball guiding slots extending in a direction which is inclined to a radius line passing through the slot and the clutch axis, and along which slots the balls on moving out of torque transmitting engagement with said openings advance towards one end portion of each slot into a position out of register with the openings in both clutch members.

The invention is an improvement in or modification of the invention the subject of our prior Patent No. 3,270,844, in the specification of which we have described and claimed an overload clutch of the kind specified, which is characterized in that the ball guiding slots are formed in one of the two clutch members, so as to extend therethrough between opposite end faces thereof, with one portion of each of the slots constituting the torque transmitting openings of such clutch member, the latter being disposed between a spring loaded thrust element and the other of the two clutch members, there being means mounting the thrust element for free rotational movement relative to both the driving and the driven members of the clutch so that when more than a predetermined torque is applied, the balls roll out of engagement with the openings in said other clutch member, and advance along the inclined slots towards the out of register end portion thereof, the arrangement being such that when the clutch is in the disengaged position consequent on more than a predetermined torque having been applied thereto, the balls are in rolling contact on each of their two oppositely axially directed sides with the opposed faces of the freely rotatable thrust element and of the said other clutch member.

The overload clutch referred to in the preceding paragraph will only operate if the direction of inclination of the ball guiding slots to the adjacent said residue line is such that when overload occurs and the balls commence to roll relative to the driven clutch member, the direction of rolling of the balls is towards as opposed to away from the out of register end portions of their respective slots. Accordingly, the clutch the subject of the prior patent application is effective for one direction only of rotation of the driving member.

Also even for such one designed direction of rotation, if the inclination of the ball guiding slots of the ball guiding element to the said radius line passing therethrough and through the axis of clutch rotation is too small, i.e., is less than about 40 to 50 degrees, such that in each case the slots extend in a direction which is the more nearly radial than tangential in relation to the clutch axis, we have found that when overload of the clutch occurs, the component of the reaction force between the edges of the slots and the balls therein acting in a direction to displace the balls along the slots away from their torque transmitting position may not be sufficient to effect such displacement of the balls. As a result, as the driving member of the clutch continues to rotate until the power thereto is cut off, the balls under the pressure of the loading means may undesirably re-engage momentarily with the torque transmitting openings, so that undesirable wear of the parts occurs, and the clutch becomes very noisy in operation under overload conditions.

The present invention has for its object the provision of certain improvements to the overload clutch described in the prior specification, which enable this to be effective in disengagement without the above limitation of ball slot inclination, and irrespective of the direction of rotation of the driving member.

According to the present invention that clutch member which is unprovided with the ball guiding slots has connected thereto to rotate therewith ball displacing means comprising a plurality of ball engaging abutments spaced circumferentially about the axis of rotation of the clutch and adapted on relative rotational movement occurring in either direction between the two clutch members, to engage with the balls and positively to displace the same in a direction along the length of their associated slot into a position in which the balls are out of register with the torque transmitting openings in both the driving and the driven clutch member.

Where, as is preferred, the slots in the ball guiding part are so arranged that the balls are displaced in the direction away from the clutch axis when overload has occurred, the ball displacing means preferably comprises a cam such as a star cam, having a plurality of circumferentially spaced peripheral lobes with dwells therebetween, with the number of lobes being not less than the number of balls and of the slots in the ball guiding part, and with the slots being spaced angularly by the same pitch distance or a multiple thereof as that of the lobes, with each torque transmitting openings of the clutch member provided with a cam having a cam dwell in radial alignment therewith.

The invention is illustrated in the accompanying drawings wherein.

Figure 1:
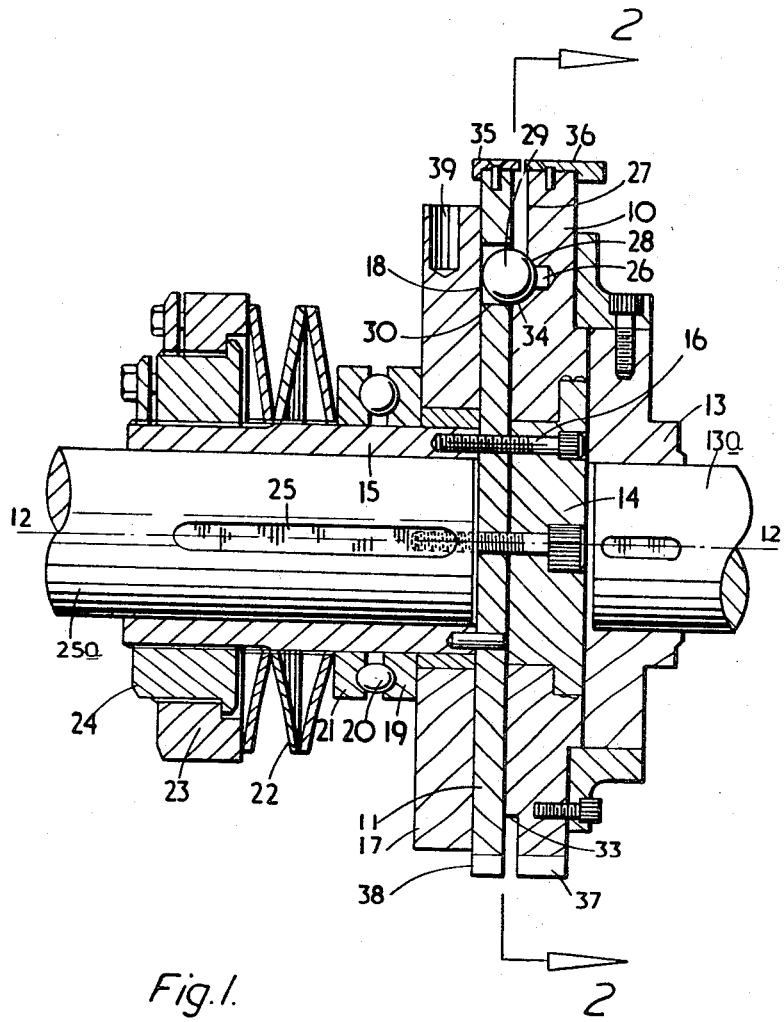
FIGURE 1 is a cross sectional side elevation of one form of overload clutch in accordance with this invention, the clutch being depicted in the engaged position.
Figure 2:
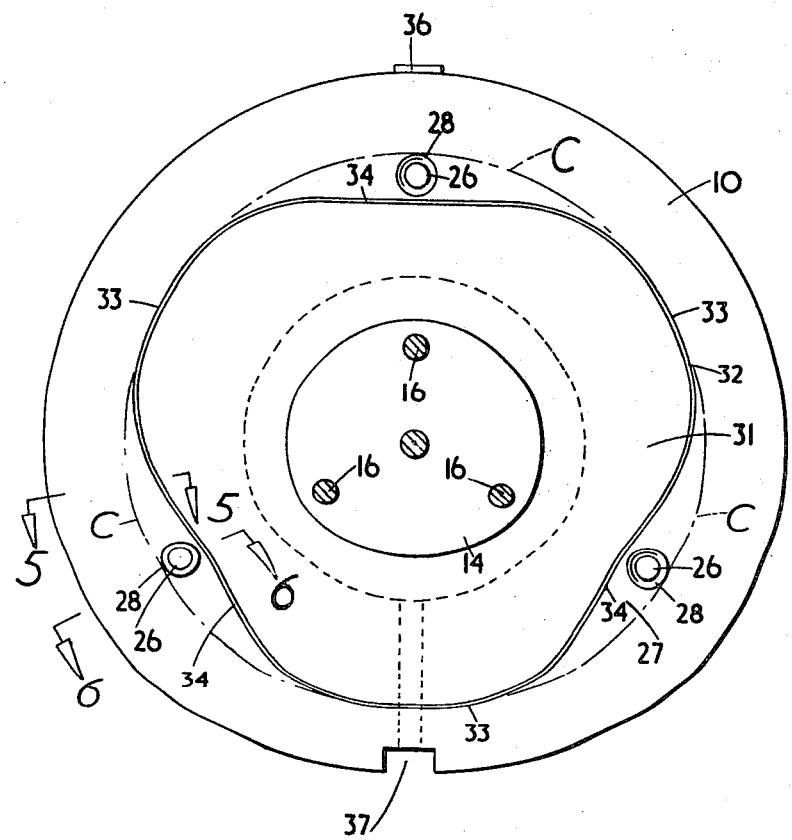
FIGURE 2 is a cross sectional view on the line 2—2 of FIGURE 1.
Figure 3:
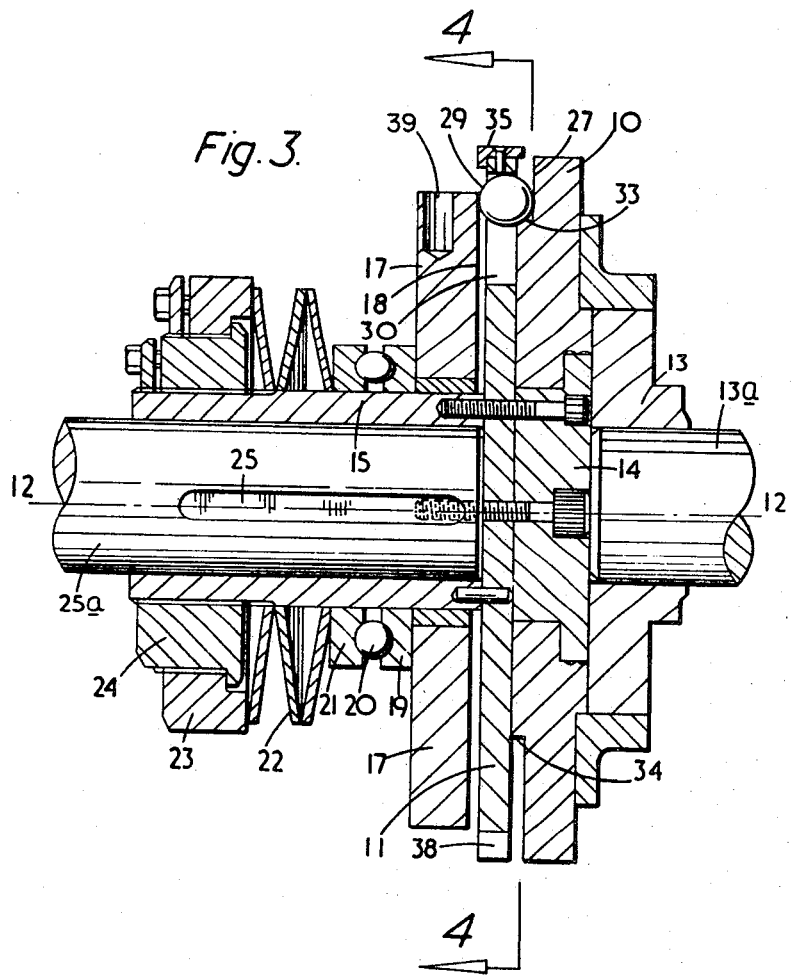
FIGURE 3 is a view similar to FIGURE 1, but showing the clutch in the fully disengaged position.
Figure 5:
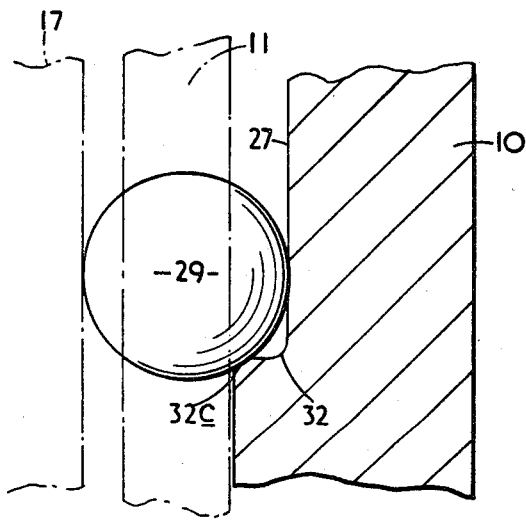
Figure 6:
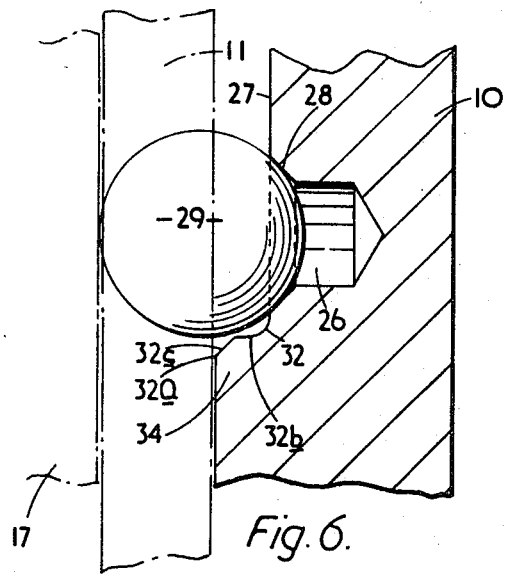

FIGURES 5 and 6 are sectional views drawn to a larger scale on the lines 5—5 and 6—6 respectively of FIGURE 2 and showing in each case part of the ball displacing cam in proximity to one of the balls.

The overload clutch illustrated in the drawing comprises driving and driven clutch members 10, 11 respectively, each of disc-like configuration and mounted for rotation in side by side relationship about a common axis 12—12.

The driving member 10 is provided with coupling means 13 for connecting to a powered driving shaft 13a, and is supported for free rotation about bearing plate 14 mounted on driven sleeve 15 through bolts 16 which serve to connect the driven member 11 to driven sleeve 15 in fixed axial relation to driving member 10.

Mounted for free rotation about driven sleeve 15 and for axial sliding movement thereon is a disc-like thrust element 17, having at one side a plane ball engaging face 18 directed towards the adjacent driven member 11, and at its opposite side being engaged by one of the two races 19 of antifriction, i.e., ball, thrust bearing 20, axially slidable on sleeve 15, and about which race 19 is freely rotatable. The other race 21 of bearing 20 engages one end of compression spring 22 constituting the resilient loading means, the other end of which spring is engaged by thrust nut 23 in screw threaded axially adjustable engagement with peripherally threaded collar 24 on sleeve 15, the arrangement permitting of the pressure of spring 22 being adjusted.

Driven sleeve 15 is provided with coupling means 25 for connecting it to a shaft 25a to be driven through the clutch.

The driving member 10 is provided with a plurality of namely three circumferentially equidistantly spaced torque transmitting openings 26, each in the form of cylindrical holes which extend inwardly from the plane face 27 of driving member 10 which is directed to driven member 11. Each opening 26 terminates in a frusto conical mouth 28, of diameter less than that of the torque transmitting balls 29, so as to have line engagement with the balls, of which a plurality are provided corresponding in number to that of the openings 26.

Figure 4:
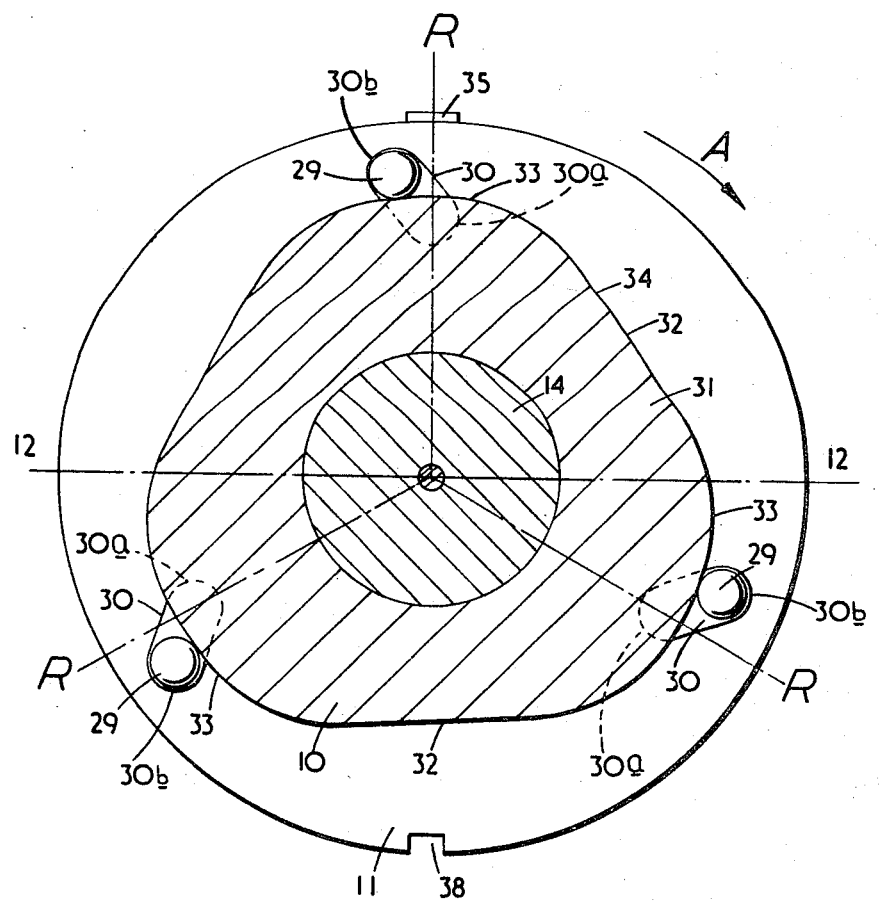
FIGURE 4 is a sectional view on the line 4—4 of FIGURE 3.

The driven member 11 is formed with a plurality of ball guiding slots 30, in number corresponding to that of the openings 26, and extending between opposite faces of member 11, with each slot 30 being inclined to the direction of circumferential rotation, so as, as shown in FIG. 4, to be inclined at an angle of about 40 degrees to the radius line R, passing through the end portion 30a of each slot which is nearest to the clutch axis 12—12.

The slots 30 are so disposed that their end portions 30a, which are nearest to the clutch axis, are each in register with a torque transmitting opening 26 in the driving member 10 for certain relative rotational positions of the clutch members 10, 11, and these end portions 30a of the slots 30 accordingly constitute the torque transmitting openings of the clutch member 11, and for this purpose have a width slightly greater than the diameter of the balls 29 so that these can extend freely through the slot portions 30a into engagement with the adjacent plane face 18 of spring loaded thrust element 17, so as thereby to be maintained releasably in torque transmitting engagement with the openings 26 in the driving member 10. To provide for the foregoing the disc-like driven member 11 has an axial thickness substantially less than, e.g., one half of, the diameter of the balls 29.

The outer ends 30b of the slots 30 are out of register with the openings 26 for all relative rotational positions of the two clutch members 10, 11, and it will be understood from the foregoing that when more than a predetermined torque is applied to the driving member 10 the torque reaction on the balls 29 causes these to roll in a circumferential direction out of engagement with the mouths of openings 26, which rolling disengagement is permitted by the line contact of the balls with the cone shaped mouths 28 of the openings 26.

As soon as the balls commence to roll out of engagement with the openings 26, they will displace the thrust element 17 against its spring loading away from driving member 10, and the balls by reason of their pressure contact with thrust element 17 will now cause this to rotate in a direction opposite to that of the still power rotating driving member 10, such rotation of element 17 being permitted by antifriction bearing 20. Thus the balls now commence rolling between the plane faces 18 and 27 of relatively oppositely rotating parts 17 and 10.

As the driving member 10 will now be rotating relative to the driven member 11, the inclined sides of the slots 30 will now apply a reaction force to the balls 29 tending to advance them along the slots to the outer ends 30b, so as to bring the balls into a position in which they are out of register with the torque transmitting openings 26, and thus prevent until the driving member is stopped undesired continued re-engagement with openings 26, with consequent rapid wear of the re-engaging parts. Such advancement of the balls is assisted by making the slots 30 slightly wider than the diameter of the balls therewithin, so that the balls can roll freely along the slots.

With the construction as so far described, when overload has occurred the balls are urged by the still rotating driving member 10 to roll in its direction of rotation. If this direction as denoted by arrow A in FIG. 4 is such as to urge the balls towards the in register ends 30a of the slots, the balls will undesirably re-engage with the driving member openings 26. Such difficulty does not arise if the direction of rotation of the driving member is opposite to that shown in FIG. 4, so that after overload the balls are urged by the rotation of the driving member in a direction which is towards the out of register ends 30b of the slots 30.

To insure that the balls 29 are advanced to the out of register ends 30b of slots 30 irrespective of the direction of clutch rotation, as well as in cases where the reaction force of the slot sides on the balls is insufficient, e.g., by reason of the angle of inclination of the slots to the radius line, being less than about 40 to 50 degrees, that clutch member which is unprovided with the slots 30, namely the driving member 10, has connected thereto to rotate therewith ball displacing means in the form of a cam 31, which, in the arrangement illustrated, is formed integrally with the disc-like driving member, namely as the periphery of a shoulder 32 formed on the face 27 of the driving member 10 at a position radially inwardly of the openings 26.

The shoulder 32 has an axial depth somewhat less than the radius dimension of the balls 29, and to prevent the balls then engaging only with the outer corner 32a of the shoulder with resultant wear to such corner 32a, this is chamfered on its radially outwardly directed faces 32b as shown at 32c in FIG. 5 so that the balls in their disengaged position, as shown in FIG. 5, engage with this part of shoulder face 32b. Also such chamfering 32c ensures as shown in FIG. 6 that when the balls 29 are in engagement with the adjacent openings 26 they are out of contact with shoulder 32, an can, consequently, when overload occurs, roll freely in a circumferential direction out of engagement with openings 26 without such free rolling disengaging movement being then impeded by engagement with shoulder 32 so as undesirably to cause wear of the parts at the instant of disengagement.

As shown in FIGURE 2, the came 31 is formed with a plurality, namely three ball engaging lobes 33 of continuously convexedly, e.g., part-circular shaped configuration, each end of each lobe 33 merging into a substantially straight portion constituting the dwells 34 of the cam, and the center of each of which straight dwells 34 is aligned with and adjacent to the radially innermost side of the torque transmitting openings 26 in the associated clutch member 10.

Thus the cam lobes 33 are disposed between each circumferentially adjacent pair of torque transmitting openings 26 in clutch driving member 10, and as shown in FIGURE 2 extend radially outwardly to a circle C within which each opening 26 just lies wholly. Thus as shown in FIGURE 4, when the driving member 10 commences to overrun the driven member 11 on overload occurring, the cam lobes 33 now become aligned with the slots 30, so as to engage with and thus positively to force the balls 29 to the outer ends 30b of the slots 30. As shown in FIGURE 4 the radial depth of cam lobes 13 is made sufficiently small as to permit of these clearing the balls when the latter are at the outer ends 30b of slots 30, in which position the balls will roll freely in a circumferential path relative to the now stationary driven member 11, with the driving member 10 and thrust element 17 turning in opposite directions, but at the same angular velocity until the power to the driving member is cut off. Insofar as the balls 29 have merely rolling engagement with the opposed faces of the driving member 10 and thrust element 17, with which faces the balls are in pressure contact and insofar as the balls are not then in pressure contact with the sides of the slots 30 at their outer ends 30b, wear of the balls and the surfaces which they engage is insignificant even though the driving member may continue to be power driven under heavy torque loading.

To enable the cam 31 to perform its above described function in the case where the direction of rotation of the driving member is such as to urge the balls towards the in-register ends 30a of the slots, i.e., is in the direction of arrow A in FIG. 4 experiments so far made indicate that it is important for this particular direction of rotation that the angle of inclination between the ball engaging sides of the slots 30 and the adjacent above mentioned radius line R should not exceed about 60°. If such angle is exceeded, it is believed that the component of the reaction force exerted by the sides of the slots on the balls acting to urge the balls towards the inner ends of the slots (for the driving member rotation direction arrow A in FIG. 4) will be so great that the cam lobes will not be effective in displacing the balls to the outer ends 30b of the slots.

To enable the clutch to be re-engaged, it is necessary to lock the driving and driven members 10, 11 against relative rotation in a position in which their respective torque transmitting openings 26 and 30a are in register, and then to rotate the thrust element 17 in a direction such that the sides of the inclined slots 30 which are furthest from the clutch axis are brought into engagement with the balls, so as to force these along the slots to the inner ends thereof by the reaction force then applied to the balls by the sides of the inclined slots 30, which are furthest from the clutch axis. For this purpose it is, of course, essential that the ball guiding slots should extend in a direction which is inclined to the aforementioned radius lines R and it is believed that if the angle of inclination between the sides of the slots 30 and the adjacent radius line R is less than about 40°, the component of the above-mentioned reaction force on the balls acting in a direction towards the clutch axis may be insufficient to displace the balls to the inner ends of the slots during the aforementioned re-engagement operation. The value of this minimum permissible angle does, however, vary with the size of the clutch and the spring pressure, the latter being, of course, dependent on the designed overload torque.

Having regard to the foregoing where it is important that the clutch should be equally effective for either direction of rotation of the driving member, it is accordingly important for most designs of clutches in accordance with this invention that the angle of inclination of the sides of the slots 30 to the aforementioned adjacent radius line R, should be between about 40° to about 60°.

To facilitate the above described re-engagement of the clutch, the two clutch members, 10, 11 are provided with alignable markers 35, 36, which are aligned axially in the above in register position, and are further provided with correspondingly then aligned peripheral tommy bar receiving openings 37, 38, which can then receive an axially extending tommy bar to lock the two members against relative rotation while thrust element 17 is now turned by a tommy bar inserted in turning hole 39 to advance the balls to the inner ends of slots 30.

If desired in the above described construction, the member 11 may form the driving member, with the member 10 having the ball displacing cam then constituting the driven member.

What we claim then is:

1. In an overload clutch, the combination of driving and driven clutch members mounted for rotation about a common axis, a plurality of torque transmitting balls interposed between said clutch members, the face of one clutch member opposing the other clutch member being provided with a plurality of torque transmitting circular openings in which said balls are receivable, a plurality of ball engaging cam lobes provided on said opposing face of said one clutch member circumferentially between said openings, the other of said clutch members having a thickness of substantially one-half the diameter of said balls and being provided with a plurality of oblique slots having said balls movably disposed therein, an axially slidable thrust plate juxtaposed to the clutch member formed with said slots at the side thereof opposite from the clutch member formed with said openings, said thrust plate being engaged by said balls and being rotatable about said common axis independently of both said clutch members, and resilient means biasing said thrust plate against the slotted clutch member for engagement of the thrust plate by said balls.

2. The device as defined in claim 1 wherein said cam lobes have an axial dimension smaller than one-half the diameter of said balls and are provided with chamfered edges which engage the balls when the latter are moved in said slots out of said torque transmitting openings.

References Cited

UNITED STATES PATENTS

| 2,902,864 | 9/1959 | Digby | 64—29 XR |
| 2,962,127 | 11/1960 | Luenberger | 192—44 XR |
| 3,270,844 | 9/1966 | Orwin | 192—56 |
| 3,305,058 | 2/1967 | Orwin et al. | 192—56 |

JULIUS E. WEST, *Primary Examiner.*

ALLAN D. HERRMANN, *Assistant Examiner.*

U.S. Cl. X.R.

64—29